United States Patent [19]
Stringer

[11] 3,748,963
[45] July 31, 1973

[54] DUAL TRACER INTERCONNECTING MEANS

[76] Inventor: George W. Stringer, 8400 Glenoaks, Sun Valley, Calif. 91352

[22] Filed: Apr. 25, 1972

[21] Appl. No.: 247,314

[52] U.S. Cl. ................................. 90/13 B, 90/62 R
[51] Int. Cl. ............................................. B23c 1/16
[58] Field of Search ................ 90/13 B, 62 R, 13.5, 90/13.8

[56] References Cited
UNITED STATES PATENTS
3,640,182   2/1972   Vertin ............................ 90/13 B X
2,389,653   11/1945   Turchan et al. ................. 90/13 B X Primary Examiner—Gil Weidenfeld
Attorney—Warren T. Jessup et al.

[57] ABSTRACT

In combination with an automatic pattern controlled milling machine wherein a first tracer is to be employed to transmit horizontal motion to a cutting tool and a second tracer is intended to be separately employed to impart vertical motion to a cutting tool, an interconnecting means connecting the first tracer and the second tracer comprising a sytlus which is connected to the first tracer and movable vertically in respect thereto, an elongated rod connected to the stylus and adapted to move vertically simultaneously with the stylus, the free end of the rod connected to the second tracer, a pivot bar secured intermediate the ends of the rod, the pivot bar pivotaly attached to the housing supporting the second tracer.

9 Claims, 3 Drawing Figures

PATENTED JUL 31 1973　　3,748,963
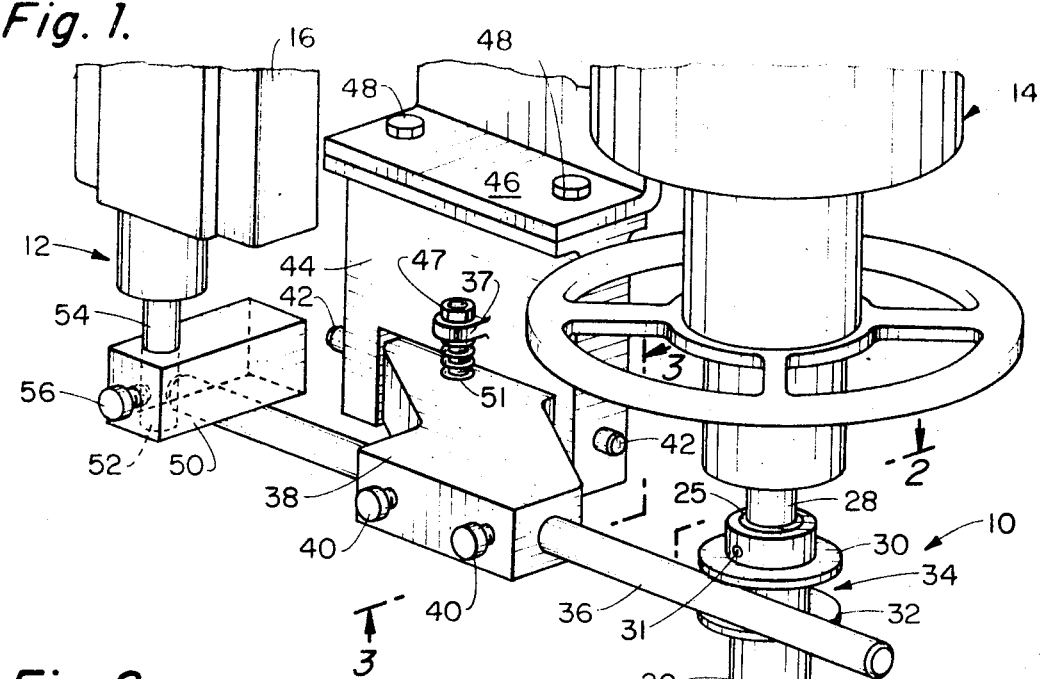
Fig. 1.
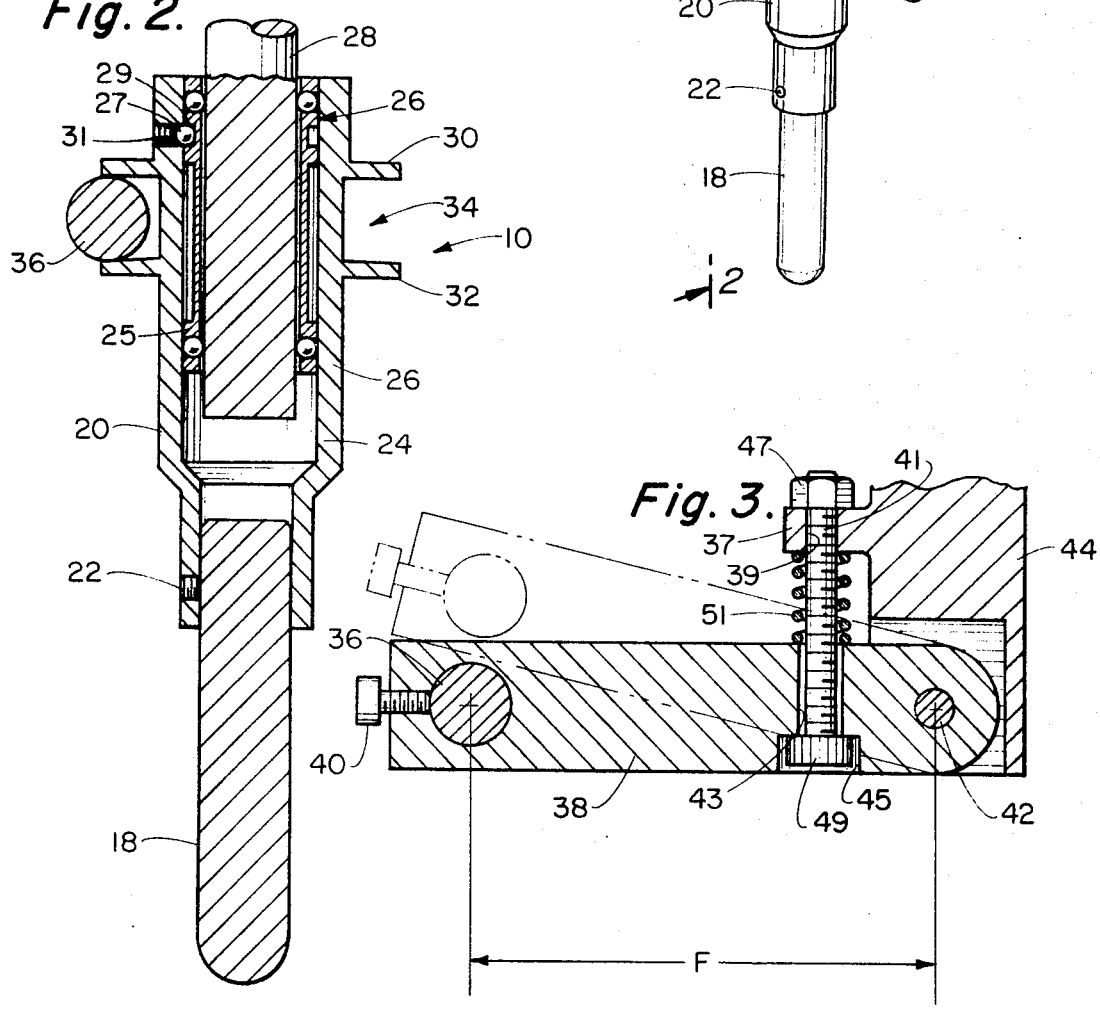
Fig. 2.
Fig. 3.

DUAL TRACER INTERCONNECTING MEANS

BACKGROUND OF THE INVENTION

The field of this invention relates to milling machines and more particularly to a tracer interconnecting means for a dual tracer, automatic pattern controlled milling machine.

In the formation of irregular surfaces on a work piece by automatic means, it is common practice to utilize a pattern for engagement by a tracer which is usually connected to the tool support to control the irregular path of movement of the tool. Some operations of this kind are rather simple in that such are mere outlining operations requiring two directional movement while other movements are more complicated requiring three directional movement of the cutting tool. A commonly employed automatic machine apparatus employs the use of a dual tracer arrangement in order to effect three directional movement of the cutting tool. The first tracer is employed which is sensitive only to horizontal movement, that is, movement in the X and Y planes only. As the first tracer is moved back and forth across the irregular work piece, corresponding X and Y movement of the cutting tool occurs. As the first tracer moves vertically over the irregular pattern within the conventional automatic machine, no vertical movement of the cutting tool occurs.

In the conventional machine, the normal procedure is to after the work piece has been outlined by the horizontal movement tracer, the pattern is moved to the second tracer and the second tracer is put into operation resulting in the producing of the vertical portion of the irregular work piece. This moving of the pattern between the first tracer and the second tracer is a time consuming procedure. Additionally, the employment of the two tracers results in a duplication of tracer movement which again is a time consuming procedure. Loss of time is a major expense factor in the machining of work pieces.

It would be desirable to design a structure which could be readily adopted to the conventional dual tracer machine wherein only the first tracer came into contact with the pattern with the result that the cutting tool moved in three dimensions.

SUMMARY OF THE INVENTION

The apparatus of this invention is designed to be employed in combination with the conventional dual tracer machine wherein a first tracer is to be employed to cause horizontal movement of the cutting tool and a second tracer is designed to be separately used to cause vertical movement of the cutting tool. The apparatus of this invention interconnects the first and second tracers so that, upon movement of the first tracer on the pattern, not only is the cutting tool moved horizontally but is also moved vertically. The first tracer is supported within a hollow stylus. The stylus includes a bearing assembly interiorly thereof to movably support the stylus with respect to the first tracer. As a result, the stylus is capable of rotational movement as well as longitudinal movement with respect to the first tracer. The head of the stylus is adapted to come into contact with a pattern. Located about the exterior of the stylus is an annular guide. A rod is to be positioned within the annular guide with the rod thereupon secured within a pivot bar. The free end of the rod is to abut a connecting block which in turn is fixed to the second tracer. The pivot bar is pivotally attached to the housing which supports the second tracer.

BRIEF DESCRIPTION OF THE DRAWING

FIG. 1 is an isometric view of the apparatus of this invention as it is installed upon a dual tracer milling machine;

FIG. 2 is a cross-sectional view through the first tracer and its associated stylus incorporated within this invention taken along line 2—2 of FIG. 1; and FIG. 3 is a cross-sectional view through a portion of the pivot bar included in the apparatus of this invention taken along line 3—3 of FIG. 1.

DETAILED DESCRIPTION OF THE SHOWN EMBODIMENT

Referring particularly to the drawing, there is shown in FIG. 1 a first tracer assembly 10 and a second tracer assembly 12. It is envisioned that the type of machine upon which this dual tracer assembly 10 and 12 is employed is a milling machine. However, it is considered to be within the scope of this invention to employ the apparatus of this invention on other dual tracer machines other than vertical cutting milling machines.

The tracer assembly 10 is attached to a housing 14 which is mounted upon slide structure (not shown) which permits the housing 14 to move in a horizontal plane along the X and Y axes. The slide structure upon which the first housing 14 is mounted is in turn mounted upon the slide structure of the housing 16 which supports the second tracer assembly 12. The resulting movements of the first tracer assembly 10 and the second tracer assembly 12 are automatically duplicated through means (not shown) to a cutting tool (not shown). It is to be understood that the cutting tool is to perform a cutting type of machining operation upon a work piece (not shown).

The dual tracer machine apparatus upon which the apparatus of this invention is to be employed is a complex piece of equipment. However, such structure has been in widespread use for a number of years and therefore it is not believed to be necessary to show and describe such a machine apparatus in detail. It is to be understood that each of the tracer assemblies 10 and 12 result in a corresponding duplicating movement of a cutting tool through an automatic machine apparatus with the result that a work piece is produced which will exactly correspond to a pattern.

The pattern is also not shown but it is desired that the head 18 of the stylus 20 is to be in continuous contact with the pattern. The position of the head 18 within the stylus 20 is fixed by means of set screw 22.

The stylus 10 includes an elongated hollow chamber 24 interiorly thereof. Within the stylus 20 and in communication with the chamber 24 is a bearing assembly 26. The conventional machine tracer 28 is to extend within the chamber 24 and be low frictionally supported therein by means of the bearings 26. Tracer 28 is unaltered when used with the apparatus 10. The bearings 26 are retained by a bearing cage 25 and free to rotate independently of stylus 20 and tracer 28. A ball 27 is located within annular recess 29 to restrict longitudinal movement of the cage 25. A set screw 31 is located within the stylus 20 to position the ball 27 within annular recess 29. The free end of the tracer 28 is fixedly mounted within the housing 14. The function of the bearings 26 is to support the stylus 20 with respect to the tracer 28 so that it can rotate as well as move longitudinally. It is very important to this invention that the stylus 20 be supported in the extremely low frictional manner upon the tracer 28.

Because of the bearings 26, as the head 18 moves past the pattern (not shown), it will readily rotate thereby making such movement as easy as possible. Also, in accomplishing the vertical portion of the movement, the stylus 20 will move a small distance vertically in respect to the tracer 28.

Integrally formed about the exterior of the stylus 20 are a pair of spaced apart discs 30 and 32. An annular space 34 is formed between the discs 30 and 32. The arrangement of the discs 30 and 32 with the annular space 34 located therebetween results in the formation of an annular guide.

One end of an elongated rod 36 is to cooperate within the space 34 of the annular guide. The diameter of the rod 36 is minutely less than the width of the space 34. The arrangement between the rod 36 and the annular guide is such that rotational movement of the stylus 20 with respect to the rod 36 is accomplished in substantially an unhindered manner. However, vertical movement of the stylus 20 is readily transmitted to the rod 36. The upper surface of disc 32 is slightly canted to decrease friction in the contact with rod 36. The housing 14 (and head 18) are movable horizontally (in the X-axis) manually for coordinating head 18 in relationship with the cutting tool. The rod 36 merely slides along within the space 34.

The rod 36 is fixedly located within a pivot bar 38 by means of set screws 40. The pivot bar 38 is to be formed of a heavy material of construction. The free end of the bar 38 is pivotally secured by a pin 42 to a block 44. The length of the pivot bar 38 is selected so that the fulcrum length F is as long as possible, so that when combined with the weight of the arm 38, sufficient torque is continuously applied to the rod 36 which will overcome the side pressure of the head 18 upon the pattern. Therefore, the head 18 and the stylus 20 are constantly biased into contact with the pattern.

A boss 37 is integrally formed upon block 44. A threaded opening 39 is formed within boss 37. A bolt 41 is threadingly connected within the opening 39. A lock nut 47 finally secures the bolt 41 to the boss 37. Bolt 41 extends through aperture 43 formed within pivot bar 38. Aperture 43 includes enlarged cut-out section 45. Bolt head 49 cooperates within the section 45. The bolt head 49 limits the downward pivotal travel of the pivot bar 38. A coil compression spring 51 is located about the bolt 41 and in between the boss 37 and the pivot bar 38. The spring 51 exerts a constant bias upon bar 38 to maintain such in the down position and to head 18 in contact with the pattern.

By the employment of spring 51, a lower weight pivot bar 38 can be employed. Also, the pivot bar 38 can be installed other than horizontal.

As a result, the tracer assembly 10 of this invention can also be used on a machine other than the vertical type of cutting machine.

The block 44 is fixedly mounted to a flange 46 by means of fasteners 48. The flange 46 is integrally attached to a portion of the housing 16.

The free end of the rod 36 is to come into contact with the undersurface of a connecting block 50. It is not necessary to have the rod 36 be fixed to the connecting block 50 but just in physical contact therewith.

Located within the connecting block 50 is a vertical aperture 52. The second tracer 54 of the second tracer assembly 12 matingly cooperates within the aperture 52 and is fixed to a block 50 by means of set screw 56.

Prior to effecting the operational procedure of the machine upon which the apparatus of this invention is employed, the stylus 20 is placed upon the first tracer 28 and the head 18 is placed in physical contact with a reference position upon a pattern. This reference position will be in starting position of the machining operation of the work piece. It is to be understood that the cutting tool has been placed in a similar position upon a work piece (not shown). With the head 18 and the stylus 20 so located, the rod 36 is located within the annular space 34. Set screws 40 are tightened so that the rod 35 is fixed in position. The connecting block 50 is then adjusted by means of the set screw 56 until it becomes into physical contact with the rod 36. This position is then fixed by the tightening of the set screw 56.

During operation of the machine structure and the forming of the work piece, the horizontal movement of the head 18, caused by the pattern, is transmitted to the cutting tool and will result in horizontal movement of the stylus 20 with respect to the rod 36. This horizontal movement is substantially unhindered due to the location of the rod 36 within the annular space 34. Also, the stylus 20 will rotate due to the frictional interaction between the pattern and the head 18. This rotation of the stylus 20 is also unhindered.

Vertical movement of the head 18 upon the pattern is directly imparted to the rod 36. This in turn results in direct transfer of the movement through the connecting block 50 to the second tracer 54. The movement of the second tracer 54 results in a corresponding movement of the cutting tool. It is to be noted that this vertical movement of the head 18 results in both the housings 14 and 16 moving vertically as well as the corresponding movement of the cutting tool.

The pivoting movement of the pivot bar 38 is depicted in phantom in FIG. 3 of the drawing. However, it is to be understood that the amount of pivoting movement depicted within FIG. 3 of the drawing is greatly exaggerated for purposes of illustration. The actual movement of the pivot bar 38 would be about one eighth of an inch.

If the bar 36 exerts an upward thrust against the connecting block 50 and the second tracer 54, this upward thrust causes appropriate movement of the cutting tool. If the rod 36 moves away from the connecting block 50 in a downward direction, the automatic means within the apparatus effects a downward movement and the second tracer 54 as well as a corresponding movement of the cutting tool. This movement is continued until the connecting block 50 comes into contact with the rod 36. The downward movement of the head 18 is quickly assured due to the weight of the pivot bar 38 combined with the length of the fulcrum F and the bias of spring 51 to keep the head 18 in contact with the pattern.

The stylus 20 is adapted to receive conventional sized heads 18 which tracer 28 is capable of using when the apparatus 10 of this invention is not employed.

What is claimed is:

1. In combination with a machine, said machine having a cutting tool to form irregular surfaces upon a work piece, the movement of said cutting tool controlled by a tracer mechanism, the movement of said tracer mechanism to be controlled by a pattern, said tracer mechanism including a first tracer and a second tracer, said first tracer movable horizontally in two directions with said second tracer movable vertically, a tracer interconnecting means comprising:
- first means connected to said first tracer and movable vertically in respect thereto;
- second means secured to said second tracer; and
- third means interconnecting said first means and said second means, said third means to transmit the vertical movement of said first means to said second means and hence to said second tracer.

2. The combination of claim 1 wherein:
said first means includes a stylus, said stylus having an interior elongated chamber, a bearing assembly located within said elongated chamber, said first tracer to extend within said chamber and be in contact with said bearing assembly.

3. The combination of claim 2 wherein:
said stylus includes a pair of spaced apart discs located upon the exterior surface of said stylus, an elongated rod positioned within the space between said discs, said rod being a portion of said third means, said rod being connected to said second means.

4. The combination of claim 3 wherein:
said stylus being rotatable with respect to said rod in a substantially unhindered manner.

5. The combination of claim 4 wherein:
a pivot bar secured to said rod intermediate the ends of said rod, said pivot bar being pivotally secured to a housing, said second tracer being secured to said housing.

6. The combination of claim 5 wherein:
said second means comprises a connecting block which is fixedly secured to said second tracer, said rod abutting the surface of said block.

7. The combination of claim 6 wherein:
said rod being spaced a predetermined distance from the pivotal connection of said pivot bar with said housing, said pivot bar being constructed of a substantially heavy material of construction, whereby the combined fulcrum length between said pivotal connection and said rod and the weight of said pivot bar functions to overcome side pressure of said stylus upon said pattern.

8. The combination of claim 5 wherein:
a biasing means being connected between said pivot bar and said housing to continuously bias said stylus toward said pattern.

9. The combination of claim 8 wherein:
said biasing means comprises a coil spring.

* * * * *